(12) United States Patent
Kerz (10) Patent No.: US 8,493,627 B2
(45) Date of Patent: Jul. 23, 2013

(54) METHOD FOR THE DIGITAL SCREENING OF HALFTONE IMAGES

(75) Inventor: Ludo Kerz, Nieder-Olm (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 851 days.

(21) Appl. No.: 12/581,526

(22) Filed: Oct. 19, 2009

(65) Prior Publication Data

US 2010/0097658 A1  Apr. 22, 2010

(30) Foreign Application Priority Data

Oct. 20, 2008 (DE) .......................... 10 2008 052 126

(51) Int. Cl.
*H04N 1/405* (2006.01)
*G06T 5/00* (2006.01)
*H04N 1/46* (2006.01)

(52) U.S. Cl.
USPC ............................ 358/3.2; 358/3.26; 358/536

(58) Field of Classification Search
None
See application file for complete search history.

(56) References Cited

U.S. PATENT DOCUMENTS

| 5,150,428 | A | * | 9/1992 | Leone et al. ................... 382/270 |
| 5,315,407 | A | | 5/1994 | Sakamoto et al. |
| 5,438,431 | A | * | 8/1995 | Ostromoukhov ............ 358/3.18 |
| 5,469,516 | A | * | 11/1995 | Kerz ............................ 382/254 |
| 5,815,178 | A | | 9/1998 | Silverbrook |
| 6,608,702 | B1 | | 8/2003 | Urasawa |
| 6,687,021 | B1 | * | 2/2004 | Kerz ............................... 358/1.9 |
| 6,853,467 | B2 | * | 2/2005 | Wadle et al. ................... 358/1.9 |
| 2006/0077469 | A1 | | 4/2006 | Asai et al. |
| 2007/0081205 | A1 | * | 4/2007 | Tai et al. ........................ 358/515 |

FOREIGN PATENT DOCUMENTS

| CN | 1152277 A | 6/1997 |
| CN | 1758703 A | 4/2006 |
| DE | 69031771 T2 | 6/1998 |
| DE | 19722697 A1 | 12/1998 |
| DE | 100222225 A1 | 11/2001 |
| EP | 1285528 B1 | 11/2001 |
| GB | 2026283 A | 1/1980 |

OTHER PUBLICATIONS

Anton and Rorres, Elementary Linear Algebra, 6th Edition 1991, Wiley Publishing, p. 4.*

\* cited by examiner

*Primary Examiner* — Barbara Reinier
(74) *Attorney, Agent, or Firm* — Laurence A. Greenberg; Werner H. Stemer; Ralph E. Locher (57) ABSTRACT

A method for the digital screening of a halftone image by using a first screen having an arbitrary desired screen width and an arbitrary desired screen angle. For the method, the threshold value matrix of a second screen with a different screen angle and width is read out and compared with the color values of a halftone image presented. In order also to approximate screens having a particular irrational tangent and to avoid unpleasant sudden exposed device pixels in clear regions, it is proposed to provide at least one second threshold value matrix having $X_3Y_3$ addresses, the $X_3Y_3$ addresses of the second threshold value matrix are displaced by a factor $1/B$ in relation to the $X_2Y_2$ addresses of the first threshold value matrix, and to read out the second threshold value matrix as soon as an error D between the first and the second screen exceeds a predefined limiting value.

17 Claims, 10 Drawing Sheets

|    |     |     |     |     |
|----|-----|-----|-----|-----|
| 41 | 113 | 133 | 72  | 1   |
| 61 | 184 | 245 | 204 | 92  |
| 153| 225 | 255 | 215 | 164 |
| 103| 194 | 235 | 174 | 51  |
| 21 | 82  | 143 | 123 | 31  |

METHOD FOR THE DIGITAL SCREENING OF HALFTONE IMAGES

CROSS-REFERENCE TO RELATED APPLICATION

This application claims the priority, under 35 U.S.C. §119, of German application DE 10 2008 052 126.4, filed Oct. 20, 2008; the prior application is herewith incorporated by reference in its entirety.

BACKGROUND OF THE INVENTION

Field of the Invention

The invention relates to a method for the digital screening of a halftone image by using a first screen having an arbitrary desired screen width (rwsp) and an arbitrary desired screen angle (asp). For this method, the threshold value matrix of a second screen is read out and compared with the color values of the halftone image presented. For this purpose, the second screen has a given screen width (ract) and a given screen angle (aact). In this case, $X_1Y_1$ addresses are assigned to the first screen and appropriate $X_2Y_2$ addresses to the second screen. During the reading of the threshold values from the second screen, an error D between these XY addresses is then determined. The intention is to compensate for this error D by a change in the reading rules.

Furthermore, the invention relates to a matrix of threshold value matrices which are used in order to compensate for the error D described.

Screening methods are used in the printing industry in order to transform originals which are built up from half tones, such as photographs, into what are known as raster bit maps, which are used during the production of printing forms for a printing process.

Depending on the printing process, different printing forms have to be produced, which can be screened in different ways.

The printing forms can be used directly, for example in digital printing, or indirectly in the printing process; it is also possible for first printing forms to be produced first for the production of second printing forms; such as films for the production of printing plates.

Suitable printing processes are, for example, offset printing, gravure printing, inkjet printing, electrophotography or other contacting or non-contacting printing processes. Printing forms can be, for example, gravure printing cylinders, printing plates or films; in the case of electrophotography, a photoconductor drum can be involved.

There are also direct printing processes such as in the case of inkjet, where a printing form itself no longer has to be produced. Despite this, screening, that is to say a screening method, which is applied to an appropriate halftone original is also needed here in order to drive the inkjet heads in accordance with an original print.

To produce the above-mentioned printing forms or else directly in order to drive the imaging elements, it is necessary to produce what are known as printing originals which are based on the screened halftone originals.

For example, the halftone original present is a photograph, which is scanned in with a scanner. During the scanning operation, the individual image points of the photograph are assigned corresponding halftone image points. These half tones from the photographic original cannot be depicted 1:1 in a printing process, since a continuous tonal value gain is not possible in the printing process as is the case for a corresponding halftone image.

In the case of offset printing, the printing form used is, for example, a printing plate which is imaged in a printing plate exposer on the basis of printing originals that are present electronically. The printing originals are raster bit maps, which are assigned to corresponding printing inks of the press. These printing originals dependent on printing inks are therefore also called color separations. The printing plates are then exposed point by point by lasers on the basis of the color separations. In this case, the information from the raster bit map is then used to drive the laser in that a device pixel of the plate exposer, that is to say the smallest exposable unit, is either exposed by the laser or not. What is involved here is binary information in the form of a bit. The more device pixels, that is to say the more points in an area, are exposed, the darker this region becomes.

For instance, half tones from the original can be simulated by exposing more or fewer device pixels within an area. Here, typically the half tones in the corresponding color separations can be assigned values between 0 and 255.

The assignment of a halftone value from the halftone original to a corresponding bit map pattern of the printing original takes place in the screening method, in that the halftone original is compared image point by image point with a threshold value matrix and, depending on the percentage proportion of the corresponding printing ink in the halftone image scanned in, points are set in the raster bit map as a function of the threshold value cluster or the threshold value matrix. In a case of a proportion of 0% of the corresponding printing ink in the halftone image point, for example no pixel is then set in the raster bit map; in the case of a proportion of 100%, 255 image points are then accordingly set. The stipulation as to at which point in the raster bit map pixel is set then emerges from the structure of the threshold value cluster. Stored in this threshold value cluster, for example, are the numbers from 0 to 255 which correspond to the corresponding color values and can be arranged in an extremely different range of ways. An appropriate example of such a threshold value cluster is sketched in FIG. 1 as prior art.

In order to depict the entire halftone original in a raster bit map, the actual screen is stored in the form of screen dot cells rp, as they are known. In general, each screen dot cell rp can assume 256 different states, which means that it is possible either for no pixel of a screen dot cell to be exposed, for some or for all 255 points of the screen dot cell to be exposed. Of course, different sizes and shapes of a screen dot cell rp are also conceivable. The entire screen is then described by all the screen dot cells rp by which the original is depicted.

Figure 2:
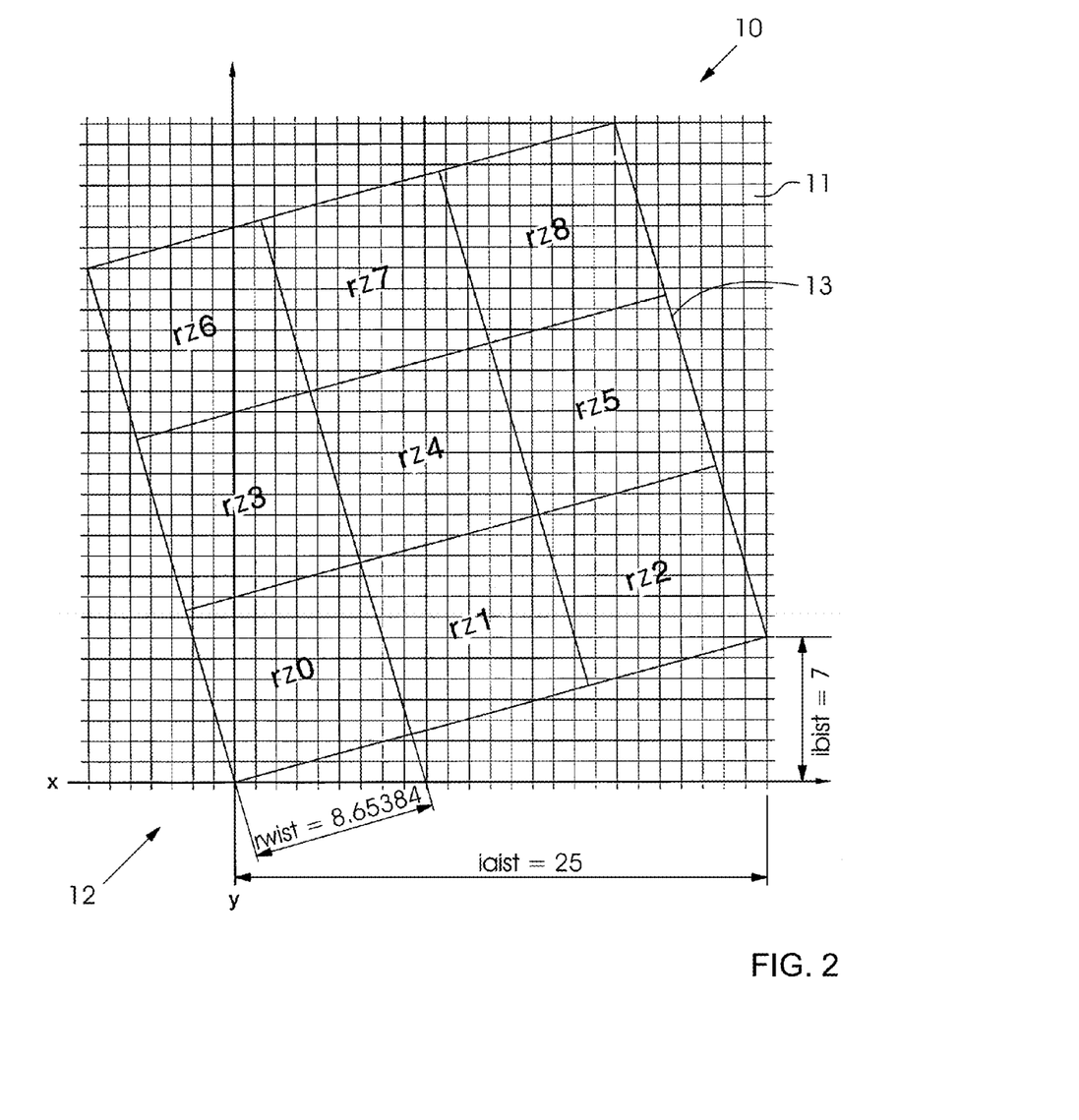
FIG. 2 is an illustration of a rational screen.

An example of an assignment of threshold values to the device pixels of a bit map is illustrated in FIG. 2. The individual device pixels of the bit map, and therefore the individual XY addresses of the threshold value cluster, are oriented to the coordinate system of the printing form exposer, that is to say the plate exposer. The screen assigned to the printing original, in the form of the arrangement of the individual screen dot cells rp, is able to assume different angles (a) relative to the predefined device pixels of the plate exposer. The spacing of the screen dot cells rp from one another is designated the screen width rw, while the angle of the screen relative to the coordinate system of the plate exposer is designated the screen angle a.

In order to prevent Moiré effects during the imaging of printing plates and ultimately during the printing of printing material, each individual printing ink is generally assigned a different screen angle a. For four color printing using the printing inks cyan, magenta, yellow and black (CMYK), operations are usually carried out with four screens of the same screen width and the screen angles 0, 15, 45 and 75 degrees in order to minimize this Moiré. Even a minimal deviation from this can cause Moiré and therefore poor or unusable image reproductions.

The individual color separations or printing originals or bit maps are transformed in what is known as the raster image processor (RIP). On the basis of the bit maps described in this way, which are assigned to the individual printing inks, appropriate printing plates are then imaged in a printing plate exposer in the form of exposed and unexposed points. These printing plates are then clamped onto a printing plate cylinder in a press in accordance with their associated printing ink and are used to image printing material, such as paper, in a known way.

Appropriately screened printing originals can in principle first of all also be used in all printing processes which are not able to depict half tones directly.

In the past, a series of methods have been disclosed as screening methods for the production of the bit maps. In particular, the distinction is drawn between what are known as rational screening methods, called RT screens in the following, and what are known as irrational screening methods, IS screens.

In the case of the IS screens, the threshold value memory contains the digital image of a single screen dot, which is stored at an angle of 0°. During the screening, for each threshold value access, a complex computational operation has to be carried out for each bit to be screened. Here, both the screen width and the screen angle, also designated only the screen below, have to be taken into account. In the case of the IS screens, screen angles with an irrational tangent are used. An irrational screening method, to the entire content of which reference is hereby made, is disclosed in German patent DE 28 27 596 C2.

In the case of the RT screens, the threshold value memory contains the digital image of one or more screen dots. When the threshold values are stored in the memory, screen width and screen angle are already taken into account and the threshold values in the memory are organized in such a way that the threshold values of adjacent image points are also adjacent in the threshold value memory. The computational operation during the threshold value access is therefore reduced substantially to an address incrementation. A rational screening method, to the entire content of which reference is hereby made, is described in German patent DE 28 27 596 C2 and in European patent EP 539 397 B1.

Since, in the case of the IS screens, only a single screen dot is stored in the threshold value memory, there is a far smaller requirement for memory space. Furthermore, the computational operation for the selection of the threshold values permits the exact implementation of all screens, in particular including the irrational angles 15 and 75 degrees which are important for color printing. By contrast, the RT screens can approximate the required screen angles only with values which can be described by a rational tangent.

While, for RT screens, appropriate bit patterns for constant color values can be produced and stored simply, for the IS methods it is in principle necessary to calculate the associated threshold value access separately for each image point to be screened. On the other hand, with rational RT screens, the important irrational angles, for example of 15 and 75 degrees, cannot be depicted but only approximated.

In order to combine the advantages of the RT screen with the advantages of the IS screen, that is to say the advantage of storing bit patterns for specific color values and at the same time to be able to use irrational screen angles, it is known from German patent DE 198 80 703 C1 to approximate an irrational screen by use of a rational screen. Then, in each case the error of the XY address of the RT screen in relation to the XY address of the IS screen to be depicted is determined. In this case, this error is broken down into XY components, for example independently of each other. Furthermore, a limiting value is provided. If the error determined exceeds the predefined limiting value either in the X or in the Y direction, then this error is compensated for by a jump within the predefined RT screen. For this purpose, the rational screen is formed by a super cell, which is formed by a periodic repetition of a number of first fundamental cells, as they are known. For instance, the number of first fundamental cells for a super cell is composed of nine screen dot cells. For complete screening of a printing original, the super cell is then run through or replicated periodically. A corresponding super cell is illustrated in FIG. 2. Then, if a pixel of a screen dot cell RP of this super cell deviates by ⅓ of the width of a device pixel from the location of the pixel in the predefined irrational screen, then within the rational screen, a jump is made to a point of another screen dot cell RP which compensates for this error in relation to the basic coordinate system of the plate exposer by an offset in the corresponding direction.

In this case, the super cell can be rotated as a whole or stored only in the form of an intrinsically rotated fundamental cell. This means that, for this purpose, the super cell is stored with its own coordinate system. Linear reading of the super cell therefore results in a rotated path relative to the coordinate system of the printing original or an exposer.

The coordinate system of the super cell or fundamental cell is in this case itself stored in a memory in a manner already rotated as a function of the desired screen angle. To apply this screen to an as yet unscreened printing original, reading in the coordinate system of the periodically duplicated super cell is carried out, that is to say this super cell is read out line by line and column by column along the index of its coordinate system via its XY addresses and compared with the tonal values of the image points of the printing originals. This then results in an oblique reading path relative to the coordinate system of the exposer. Alternatively, it would also be possible to store non-rotated super cells and, before reading them out, to apply appropriate rotational operators to them. Such a use of super cells stored in non-rotated form is already known from earlier hardware screening devices, in which a screened film was exposed simultaneously with the scanning of a printing original. Such machines were already being marketed in the 80s, for example by Linotype-Hell AG.

In the method described in German patent DE 198 80 703 C1, specific frequencies, that is to say specific screen widths at specific predefined screen angles asp, can be implemented only when extremely large super cells, that is to say threshold value clusters which cover a plurality of screen dot cells, are used.

On the other hand, a problem arises because a jump is made from the first screen dot cell to a position of a second screen dot cell which is not identical to the first screen dot cell. In addition, the threshold value clusters can additionally differ considerably from one another. In this way, desired structures of screen dots in the region of such a jump cannot be reached. A "partly eroded" screen dot of undefined size is produced in the region of such a jump point.

SUMMARY OF THE INVENTION

It is accordingly an object of the invention to provide a method for the digital screening of halftone images which overcome the above-mentioned disadvantages of the prior art methods and devices of this general type.

With the foregoing and other objects in view there is provided, in accordance with the invention a method for digital screening of a halftone image. The method includes providing a first screen having an arbitrary desired screen width, an arbitrary desired screen angle, and assigned $X_1Y_1$ addresses; and reading out and comparing a first threshold value matrix of a second screen with color values of the halftone image. The second screen has a given screen width, a given screen angle, and assigned $X_2Y_2$ addresses. During a reading of threshold values, an error D between the XY addresses of the second screen and the first screen is determined. At least one second threshold value matrix is provided and has assigned $X_3Y_3$ addresses. The $X_3Y_3$ addresses of the second threshold value matrix are displaced by a factor 1/B in relation to the $X_2Y_2$ addresses of the first threshold value matrix. The second threshold value matrix is read out as soon as the error D exceeds a predefined limiting value.

The object is achieved by a generic method in which, at least in addition to the first threshold value matrix, a second threshold value matrix is also provided, which is in turn assigned $X_3Y_3$ addresses. These $X_3Y_3$ addresses of the second threshold value matrix are displaced by a factor 1:B in relation to the $X_2Y_2$ addresses of the first threshold value matrix, and the second threshold value matrix value is read out beginning at the instant at which the error D determined exceeds the predefined limiting value.

As described in German patent DE 198 80 703 C1, here, too, therefore once more an error D between the XY addresses of the threshold value from the rational screen which is intended to approximate the irrational screen in relation to the XY addresses of the basic coordinate system, that is to say the coordinate system of the plate exposer, is determined. If this error exceeds a specific magnitude, then once more there is a jump away from this device pixel just read out to a point which compensates for this error. As distinct from the prior art, however, here a jump is not made into the same super cell, instead a jump is made into a second super cell, that is to say into a second threshold value matrix. In this way, an extremely large super cell is no longer needed in order to represent specific screen widths at specific screen angles. It is merely necessary to keep various super cells ready which are displaced in relation to one another by an amount which corresponds to the limiting value beginning at which an error is exceeded when reading out the rational screen in relation to the irrational screen.

In a further development of the method, provision is advantageously made in terms of content for the second threshold matrix to be substantially identical to the first threshold value matrix. In this way, it is ensured that, in the event of a jump from the first to the second threshold matrix, no "partially eroded" screen dot is produced. It is possible to jump to an identical position of an identical screen dot cell RP of the appropriately displaced super cell. Therefore, in this connection the term threshold value matrix is used in such a way that, in particular, a super cell made of a plurality of fundamental cells or screen dot cells rp is to be included; it is in turn possible for each fundamental cell intrinsically to be a threshold value matrix.

Furthermore, additionally or alternatively, provision is made that, beginning with the exceeding of the limiting value by the error, it is no longer the $X_2Y_2$ addresses of the first threshold value matrix which are read out but the $X_3Y_3$ addresses from the second threshold value matrix that correspond to these addresses. In this way, screen dots that are built up irregularly are avoided.

In order to be able to compensate for errors in different directions of the coordinate system and in order to ensure the smallest possible limiting values, provision is made that, in addition, together with the first and second threshold value matrix, a total of n×n matrices are provided, to which XY addresses are assigned, so that the matrices are in each case displaced in relation to one another by a factor 1:B in the X and/or Y direction. Thus, advantageously, by means of n×n matrices, in each case errors which correspond to the nth fraction of a device pixel in the X and/or Y direction are compensated for by a jump to another threshold value matrix which is displaced by an nth fraction or nth to n−1st fraction in this direction. For this purpose, provision is in particular made for the factor 1:B to correspond to the nth fraction of a device pixel, n being the root of the number A of threshold value matrices provided. The factor 1:B thus corresponds to the factor 1:n if n×n matrices are provided.

In order in each case to achieve stable printed images, for this purpose provision is also made, as described above, for the n×n threshold value matrices to be substantially identical to one another.

In a preferred embodiment, the screening is not carried out on the basis of the complete super cells, that is to say one corresponding threshold value matrix; instead the memory required is reduced by only a selected defined reference region being stored as a reduced extract from the threshold value matrix or the super cell. This extract is preferably a block from the super cell which corresponds to the width of the super cell but of which the height is reduced to such an extent that the screen is formed by lining up this reduced extract many times, in particular with an offset.

In a further particularly preferred embodiment, provision is made for the threshold value matrices, that is to say the super cell or the reduced extract, to be stored in a coordinate system in a manner rotated relative to the coordinate system of the imaging device. In order to screen the printing originals, the indices of this coordinate system are then run through, which results in a rotating screen path through the printing original, in particular in relation to the coordinate system of the exposer.

In this case, in one embodiment, it may also be possible for the super cell to be stored in its own rotated coordinate system relative to the exposer coordinate system and for the reduced extract to be formed as a reference region by a block of the super cell which is located obliquely in the coordinate system of the super cell such that its boundaries are arranged parallel to the coordinate system of the exposer.

The path with which the reduced extracts are read out in order to screen an original does not have to run line by line but, in a general variant, can also have jumps in order to depict the entire screen; to this end in particular an execution rule can be stored.

In order to achieve the fastest possible screening of an original, provision is made for the number of read addresses after which the error D exceeds the limiting value to be determined in advance, for this number to be stored and for the error to be compensated for without further calculations following the reading of this number of XY addresses from the threshold value matrix just read by reading out a corresponding different threshold value matrix which compensates for this error. For this purpose, the other threshold value matrix to which a jump is made is displaced substantially by the magnitude of this error determined.

The limiting value is further divided up into an X component and a Y component, which should preferably be of equal size and, for the purpose of correction, a jump is made into an appropriate threshold value matrix which is displaced by this error D in the X and/or Y direction.

In order to keep as low as possible the number of threshold value matrices to be provided, according to the invention a distinction is drawn between the sign of the error D determined and, depending whether the error between the XY addresses to be read out from the first screen to be achieved and the threshold value matrices read out runs in the reading direction or counter to this direction, a jump is made to the same XY address of the displaced threshold value matrix or to a position in this threshold value matrix which is different by one device pixel in the X or Y direction.

For this purpose, provision is moreover particularly advantageously made that advantageously particularly preferably 2×2 or 3×3 matrices are used which are all displaced in relation to one another in the X and/or Y direction by a factor 1:B, with the same sign in each case. Preferably, the individual matrices are then displaced in relation to one another by half the width of a device pixel or by ⅓ of this width, depending on whether 2×2 or 3×3 matrices, that is to say 4 or 9 matrices, are used.

In addition, in order to achieve the above-mentioned object independently, a matrix of threshold value matrices for use in a screening method described is claimed independently. The object described is achieved by a corresponding matrix having n×n matrices, which are each assigned to individual XY addresses and/or a common coordinate system. The n×n matrices are then read out in order to screen a halftone image and, as described, have threshold values which, via a comparison with the color of a point of the halftone image, determine whether a bit in a bit map corresponding to the halftone image is set or not. In order to compensate for an error between the screen to be approximated and the threshold value matrices used, the threshold values in each case of one of the n×n matrices are displaced in pairs in relation to the addresses of the other matrices by at least one fraction 1:B. The advantage of such a matrix of threshold value matrices has already been described.

This matrix can be built up in such a way that the XY addresses of a matrix are displaced in relation to a common coordinate system with the other matrices by the fraction 1:B or, in an alternative embodiment, the threshold values of a matrix are themselves displaced by this fraction in relation to the XY addresses of the matrix. This means that it is not the actual XY addresses which are displaced; instead the threshold values assigned to these XY addresses are displaced somewhat.

Otherwise, as already described above, n should preferably be selected from the set containing 2 and 3. In this way, the number of matrices needed and therefore also the storage space taken up is kept small and, at the same time, in a development of the invention, the error 1:D to be compensated can be reduced to an acceptable fraction ½ or ⅓ of a device pixel.

Other features which are considered as characteristic for the invention are set forth in the appended claims.

Although the invention is illustrated and described herein as embodied in a method for the digital screening of halftone images, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
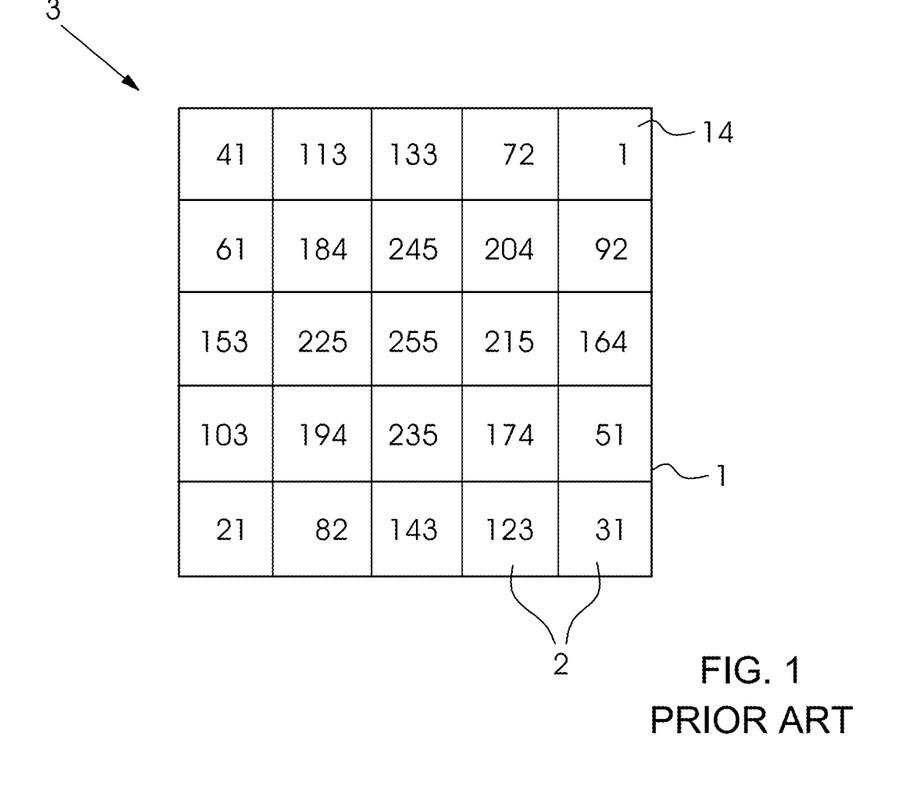
FIG. 1 is an illustration of a simplified example of a threshold value matrix according to the prior art.

Referring now to the figures of the drawing in detail and first, particularly, to FIG. 1 thereof, there is shown a simplified representation of a known threshold value matrix 3, which here is built up from 5×5 threshold values 14, which are assigned to individual screen dots 2. The threshold value matrix 3 shown here contains one screen cell 1.

The example illustrated here shows 5×5 threshold values 14, which can assume values between 1 and 255. For the more usual case of an 8×8 threshold value matrix 3, all values from 1 to 255 would be represented. As a result of the simplified illustration or else for an example of a 5×5 threshold value matrix 3, only individual intermediate values would be represented, as illustrated here.

Depending on the percentage coverage value of a halftone dot which is to be depicted by the threshold value matrix 3, different numbers of screen dots 2 of the screen cell 1 are exposed. For the case in which there is no tonal value, no screen dot 2 is exposed; in the case of complete area coverage, all the screen dots 2 having threshold values between 1 and 255 and tonal values between 0 and 100%, screen dots 2 from 1 up to the threshold value 14, which corresponds to the percentage coverage value, will be exposed. An 8×8 threshold value matrix 3 could therefore assume 256 values, which correspond to coverages between 0 and 100%.

FIG. 2 shows a bit map 10 to which a rational screen 13 is assigned. The rational screen 13 is built up from 9 screen cells rz0 to rz8. The bit map 10 contains device pixels 11, which are assigned to a coordinate system 12 of an exposer for printing forms. Depending on the individual tonal values of the half tones which are assigned to the individual screen cells rz0 to rz8, the screen cells rz0 to rz8 are imaged in such a way that the device pixels 11 are exposed as a function of the threshold value matrices 3 of the individual screen dots rz0 to rz8, as described for the screen cell 1 from FIG. 1.

The bitmap 10 illustrated in FIG. 2 is covered by the rational screen 13, that is to say, with respect to the coordinate system 12, the screen 13 assumes an angle which can be described by a rational tangent. In this case, the tangent is determined by the distances iaact and ibact of two adjacent corner points of the rational screen 13 from the abscissa and ordinate, respectively, of the coordinate system 12. In the case of the rational screen 13, these corner points are located first by definition on the origin of the coordinate system 12 and second at a point of intersection of two whole values.

Figure 3:
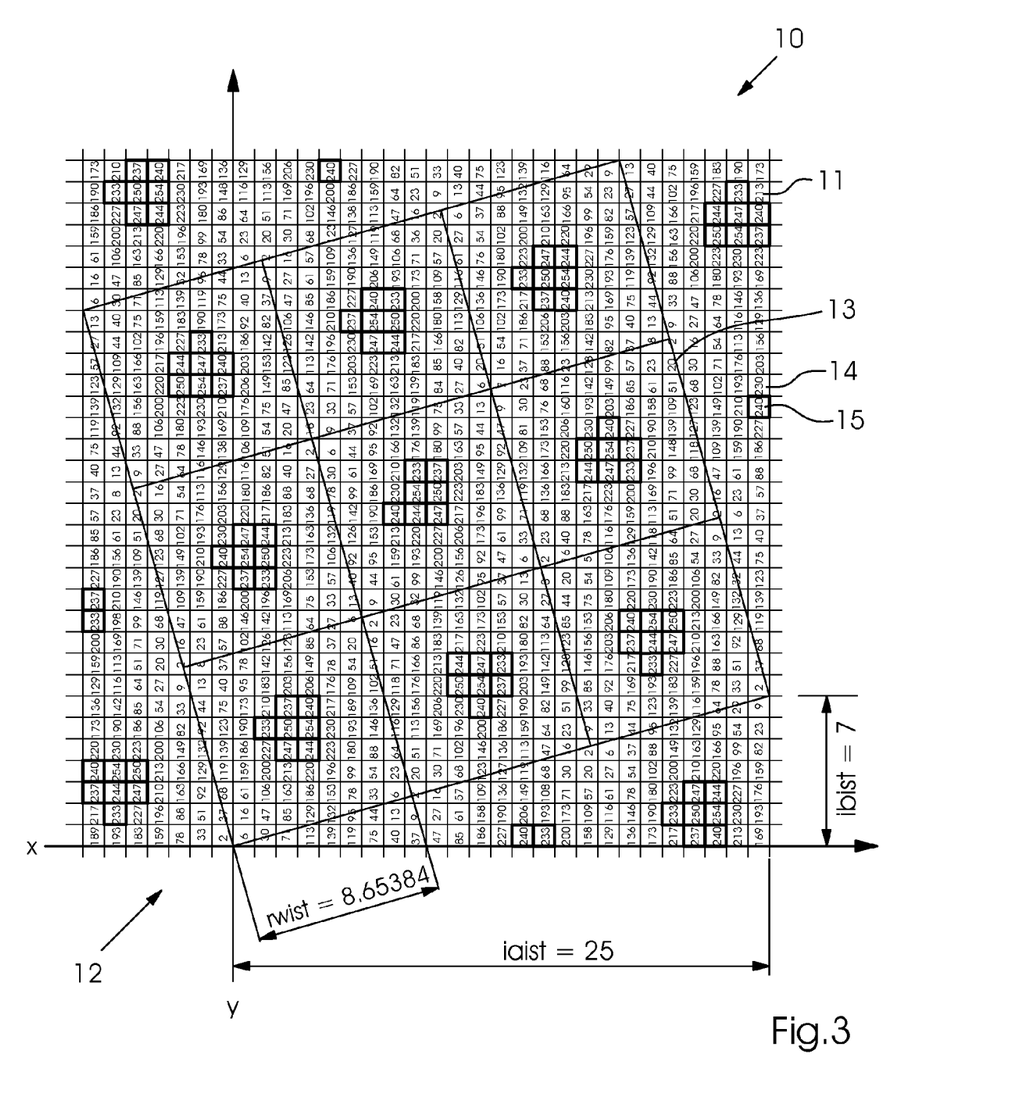
FIG. 3 is an illustration of a rational screen with an associated threshold value matrix.

In FIG. 3, the rational screen 13 is illustrated again with the bit map 10, the bit map 10 and the individual device pixels 11 of the plate exposer now also being assigned an entire threshold value matrix such that the device pixels 11 are in each case assigned threshold values 14, which are imaged as a function of the tonal values in such a way that bits 15 to be exposed are assigned in accordance with the screen bit map 10. The exposing bits 15 then correspond to the device pixels 11 at whose xy coordinate an appropriate imaging device exposes a printing form. The screen cells rp0 to rp8 in this case form what is known as a super cell, which represents the entire screen 13 by means of periodic repetitions.

The super cell can be simplified further by a reduced extract, as a reference region from the super cell rotated counter to the scanning direction, being used for the screening. For this purpose, the super cell is stored in a coordinate system which itself is rotated appropriately in relation to the scanning direction. The super cell can then be read out parallel to this coordinate system. Such a reduced extract is described in published, non-prosecuted German patent application DE 40 13 411 A1, in particular in relation to FIG. 3 presented there, to the content of which reference is made for this purpose and is hereby incorporated by reference herein. In this case, the super cell or the screen is built up by means of the rotated reduced extract by new lines being formed, if necessary via an offset of the extract in relation to a previous line. The screen itself is thus built up completely by an extract of the rotated super cell. Here, the extract is chosen such that it lies parallel to the screen, that is to say does not appear rotated. The screen is then formed by lining up the extract in a row with an offset. To read out the extract, stored complex path rules can also be stored. In addition, the extract can also be formed in such a way that it is oriented parallel to the axes of the coordinate system of the super cell.

Figure 4:
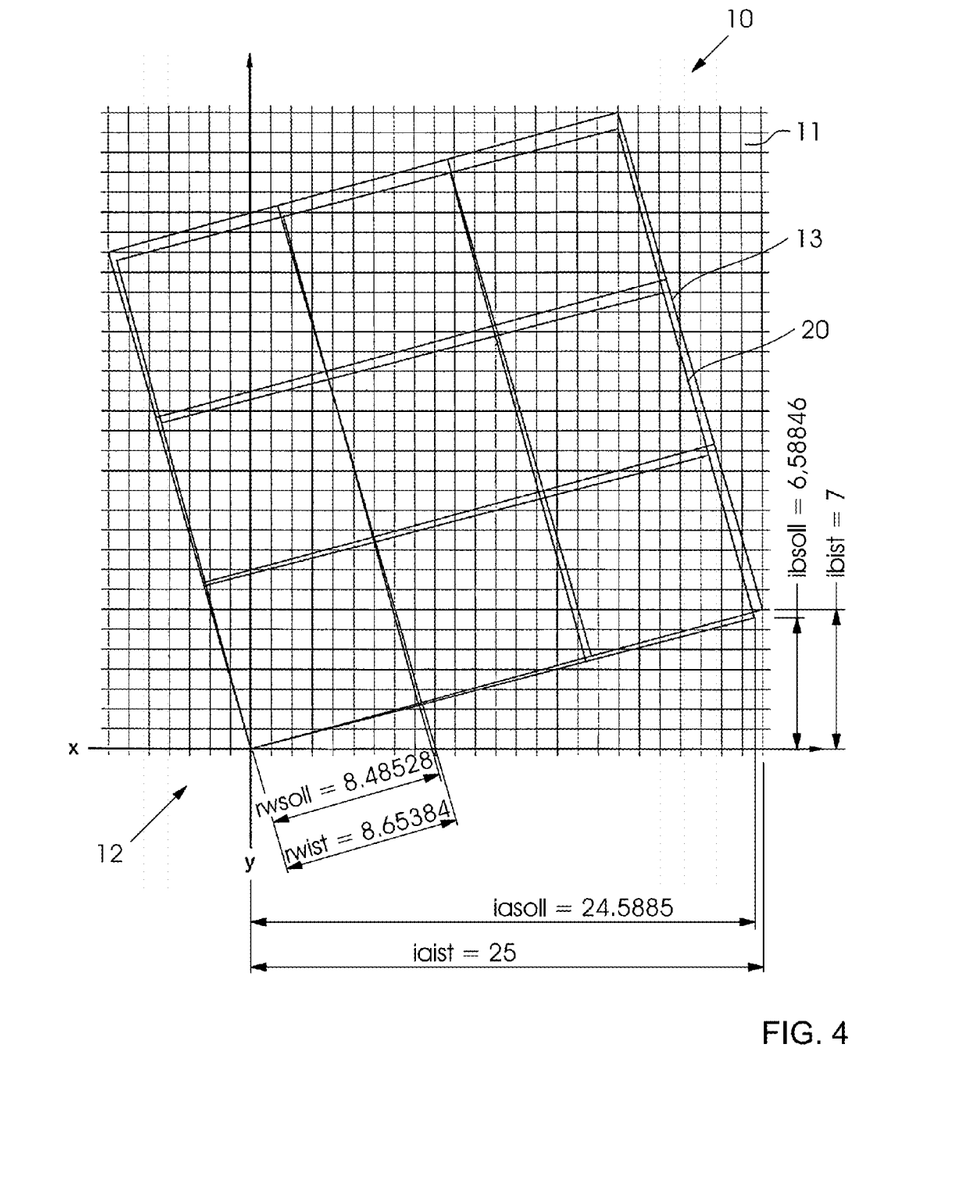
FIG. 4 is an illustration of an irrational screen with an associated rational screen.

FIG. 4 shows the rational screen 13 according to FIGS. 2 and 3 and, in addition, an irrational screen 20, which is to be approximated by the rational screen according to the prior art of European patent EP 0 990 343 B1. In order to describe this prior art and the stipulations for the corresponding jump conditions, reference is made to this patent which is hereby incorporated herein.

As distinct from the prior art, when a predefined error is reached between the screen dots of the rational screen and the screen dots to be approximated from the irrational screen 20, a jump is not made to a corresponding position of the rational screen 13 of the predefined threshold value matrix 3 which would compensate for this error; instead a jump is made to a completely different threshold value matrix 3' to 3''', the threshold value matrices 3' to 3''' each being displaced by a fraction 1/n in relation to the coordinate system 12 of the imaging device. The fraction 1/n is given in this case by the number of threshold value matrices which are used to approximate to the irrational screen 20. For this purpose, a matrix 30 of threshold value matrices 3 to 3''' is provided. This is an n×n matrix 30. In the example presented in FIG. 5, it is a 2×2 matrix 30; for example 3×3 matrices can also be imagined. A corresponding matrix of threshold value matrices 31 with nine threshold value matrices A to G is illustrated in FIG. 5A.

Figure 5:
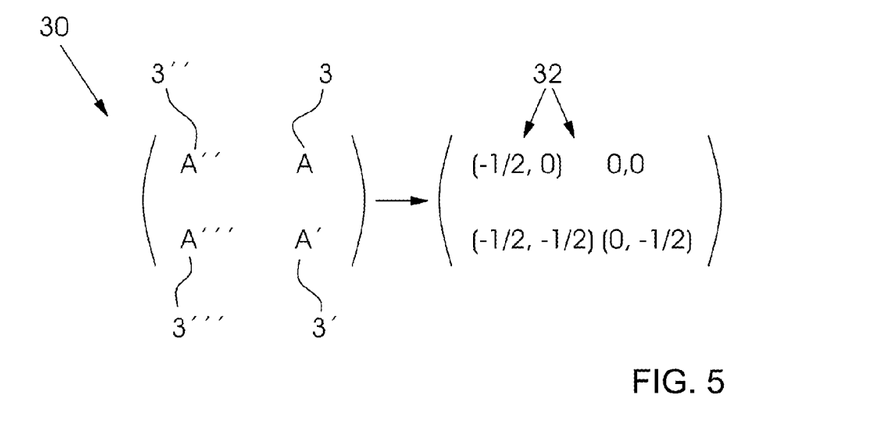
FIGS. 5 and 5A are illustrations showing a symbolic structure of a matrix of threshold value matrices.
Figure 5A:
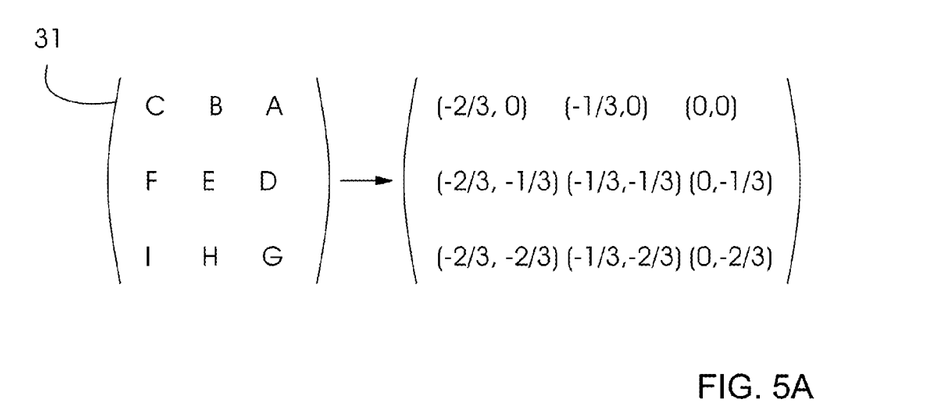

The matrices illustrated in FIG. 5 and FIG. 5A are super cells which are built up from threshold value matrices. The super cells themselves can be built up by lining up fundamental cells in a row. Each super cell or each fundamental cell is in this case stored in rotated form in a memory with an individual coordinate system as a function of the desired screen angle. In order to screen a printing original, each rotated super cell is read out linearly line by line and column by column in relation to its XY addresses. The XY addresses of the rotated threshold value matrices in this case exhibit deviations from the desired irrational screen. The coordinate system 12 from FIG. 4 represents the coordinate system of the printing forms, that is to say the printing plates, in relation to which the respective coordinate systems of the threshold value matrices 3, 3', 3'', 3''' are rotated. The printing plates are exposed, for example, in an external drum exposer by the exposer drum rotating in a first direction with the printing plate and an imaging module being advanced transversely thereto in the axial direction. The direction of rotation then corresponds to the X axis and the direction of advance to the Y axis of the coordinate system 12.

In FIG. 5, the threshold value matrices 3 to 3''' are described by matrices A to A'''. As illustrated by the arrow, these threshold value matrices 3 to 3''' are in each case assigned displacement vectors 32. In the case of a 2×2 matrix of threshold value matrices 30, four displacement vectors 32 are involved, one assuming the value 0. The others are given by the fact that the individual threshold value matrices A' to A''' are displaced by $-\frac{1}{2}$ in the X direction, $-\frac{1}{2}$ in the Y direction and $-\frac{1}{2}$ both in the X direction and in the Y direction in relation to the coordinate system 12, in units of a device pixel 11.

As illustrated in FIG. 5A, in the case of a 3×3 matrix of threshold value matrices 31, the result would be nine threshold value matrices A to G, which are displaced by values of $-\frac{1}{3}$ and $-\frac{2}{3}$ in the X or Y direction in relation to the origin of the coordinate system 12. Also provided are matrices F, E, I, H, which are displaced at least partly by a factor $-\frac{2}{3}$ in the X and/or Y direction in relation to the origin of the coordinate system 12.

Examples of threshold value matrices 3 to 3''' which are in each case displaced by half a device pixel 11 in relation to the origin of a coordinate system 12 are shown by FIGS. 6A to 6d.

Figure 6A:
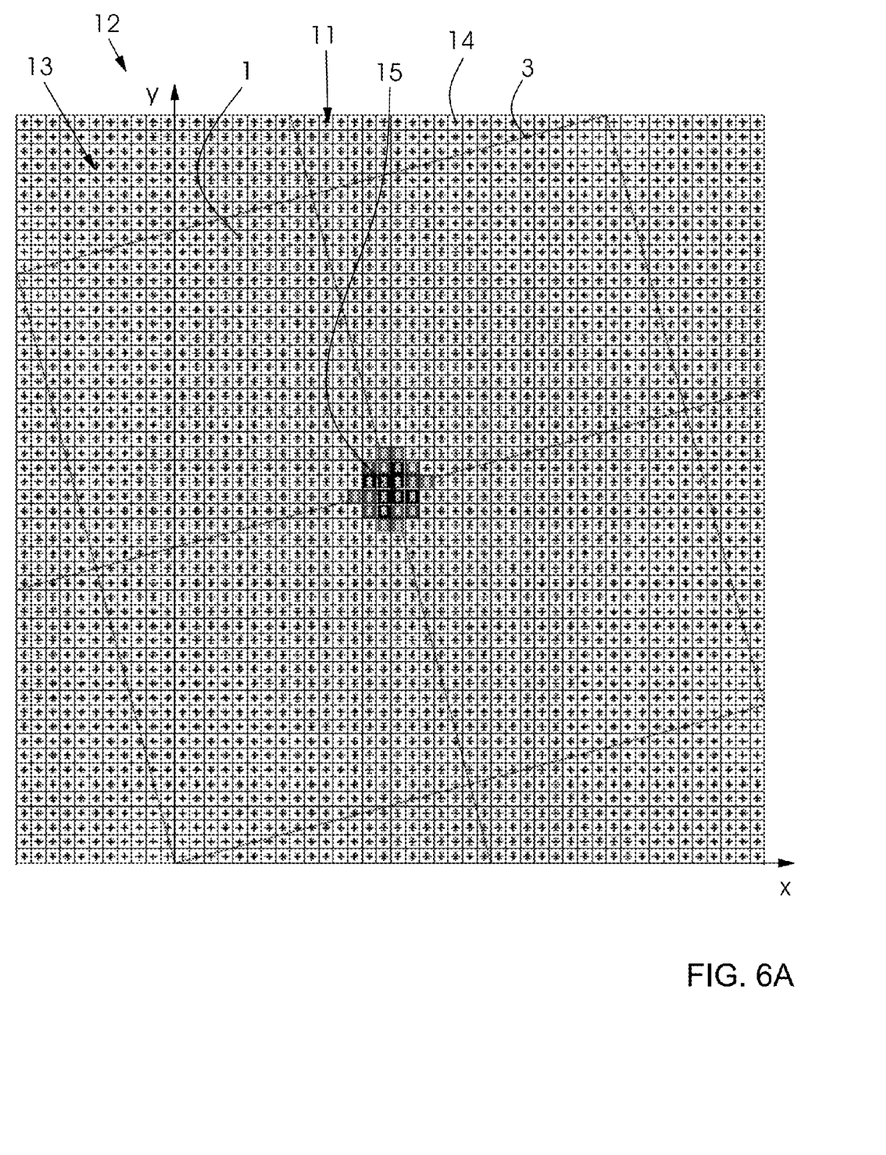
FIGS. 6A-6D are illustrations showing threshold value matrices from the matrix of threshold value matrices.

Here, FIG. 6A shows the threshold value matrix 3 which has not yet been displaced in relation to the origin of the coordinate system 12. This is a rational threshold value matrix 3, which describes a rational screen 13. Here, the screen 13 is described by a super cell containing four screen dots 1. Merely as an example, exposed bits 15 are illustrated in the region of the connecting points of the individual screen cells 1. The origin of the coordinate system 12 has been placed here at the bottom left corner of the screen 13, that is to say on the super cell formed by the screen dots 1 shown here. In this case, of course, the origin of the coordinate system 12 can in principle be positioned arbitrarily.

Figure 6B:
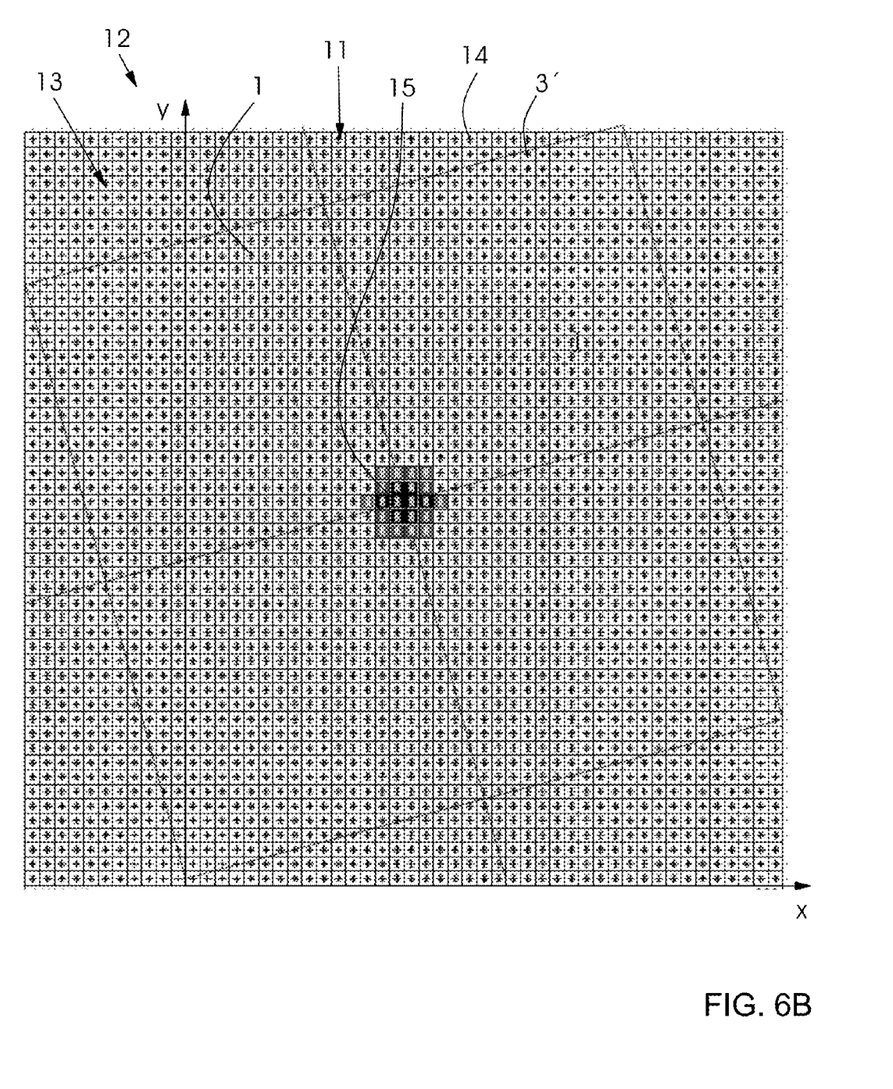

In FIG. 6B, a further screen 13 is illustrated, having a threshold value matrix 3' which has been displaced by one half of a device pixel 11 in the Y direction. In the case of the error between the irrational screen 20 which is to be approximated by the rational screen 13, if the use of the first threshold value matrix 3 leads to an error of a negative half device pixel, then it is sufficient to jump from the XY address of the first threshold value matrix 3 to the same XY address of the displaced threshold value matrix 3'. From this moment on, this error has been compensated for. In terms of their structure, the threshold value matrices 3 to 3''' are completely identical. During the processing of the threshold value matrices, as a result of the jump from one threshold value matrix 3 to another, second threshold value matrix 3' to 3''', there are therefore no changes in the exposed bits 15, since the latter are located at the same positions within the screen dots 1.

Figure 6C:
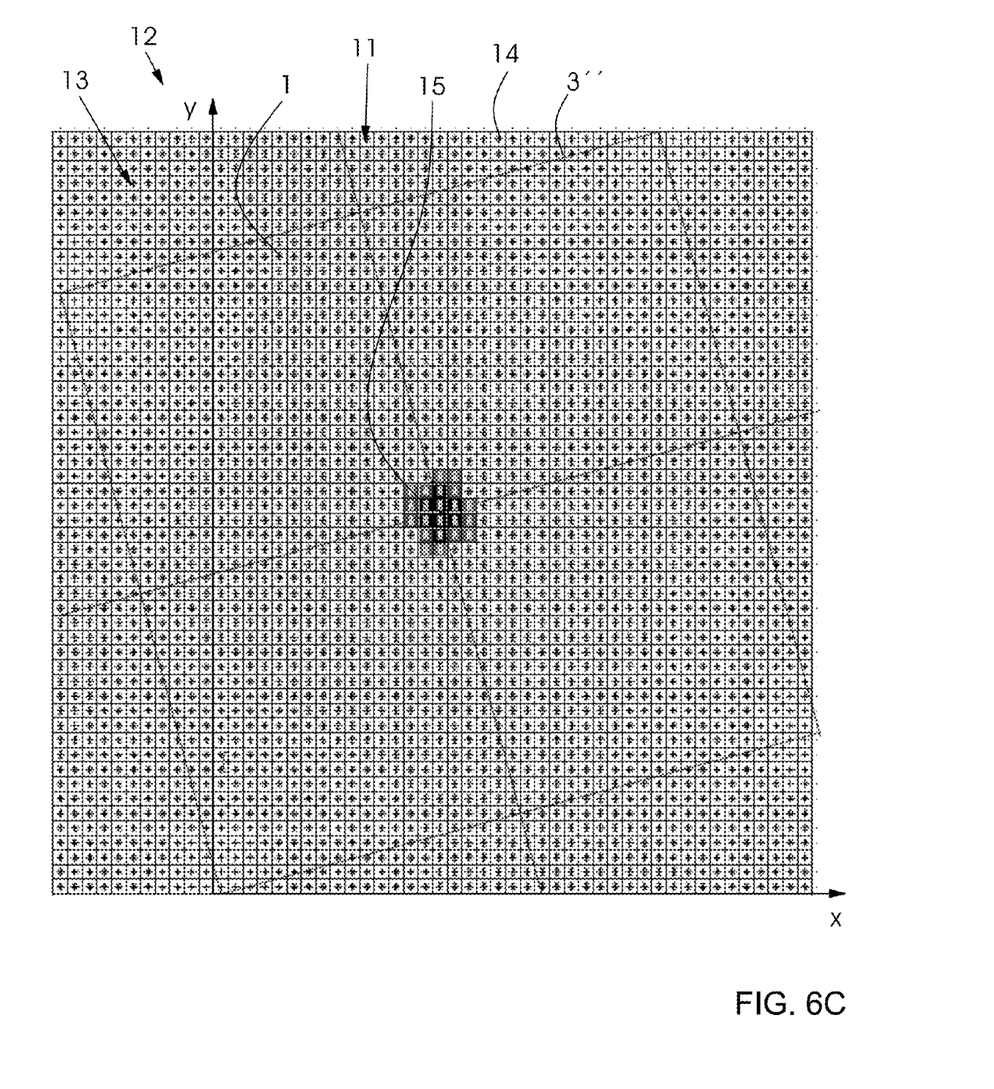
Figure 6D:
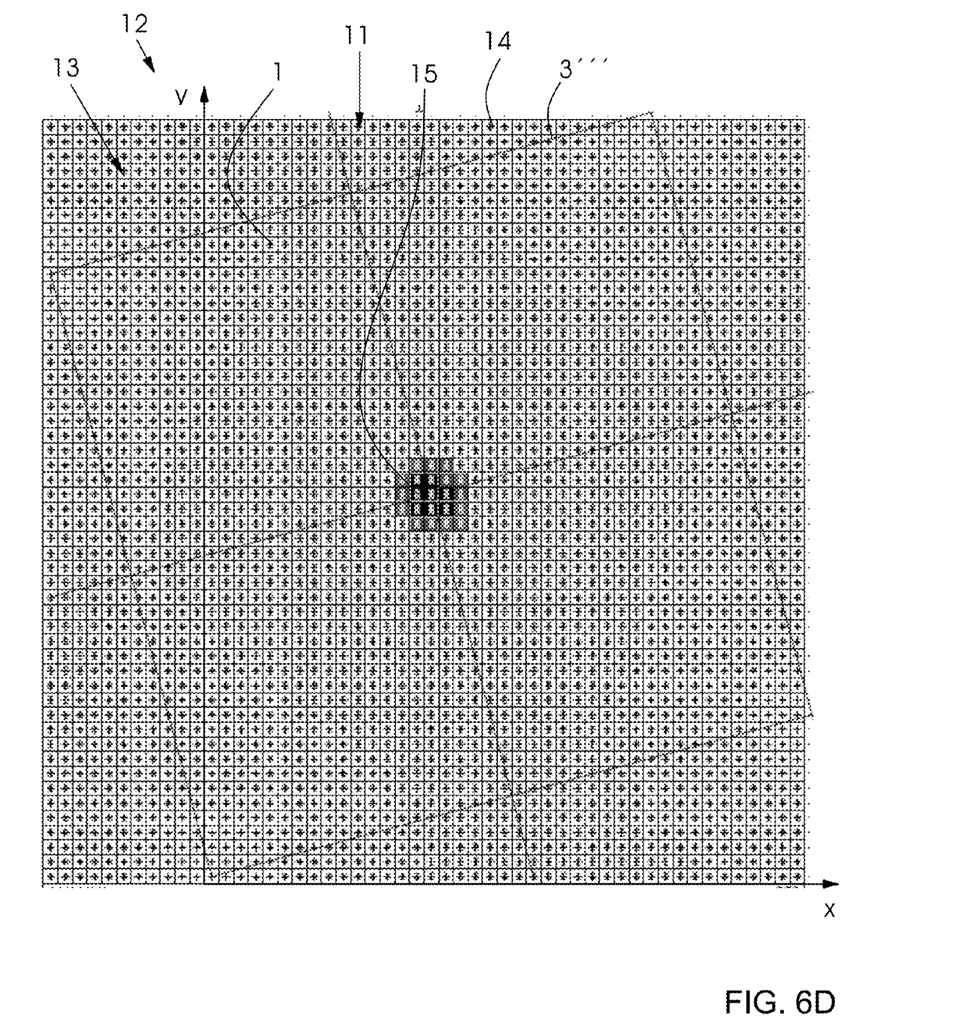

FIG. 6C shows a threshold value matrix 3'' displaced by one half of a device pixel in the X direction, while FIG. 6D shows a threshold value matrix 3''' displaced by one half of a device pixel both in the X and in the Y direction. If the error between the rational screen 13 and the irrational screen 20 is not $-\frac{1}{2}$ a device pixel 11 but one positive device pixel, then a jump is made to a corresponding address (X−1, Y), (X, Y−1)

or (X−1, Y−1) of one of the threshold value matrices 3' to 3'" which has been displaced by one half of a device pixel in the X, Y or X and Y direction.

Since, as described above, all the threshold value matrices 3, 3', 3", 3'" assume the same angle relative to the coordinate system 12, these threshold value matrices 3, 3', 3", 3'" can be built up by means of the same rotated fundamental cells or super cells or the reduced extracts assigned to the latter, in such a way that only the origin of the coordinate systems assigned to the matrices 3, 3', 3", 3'" is appropriately displaced with respect to one another.

Figure 7:
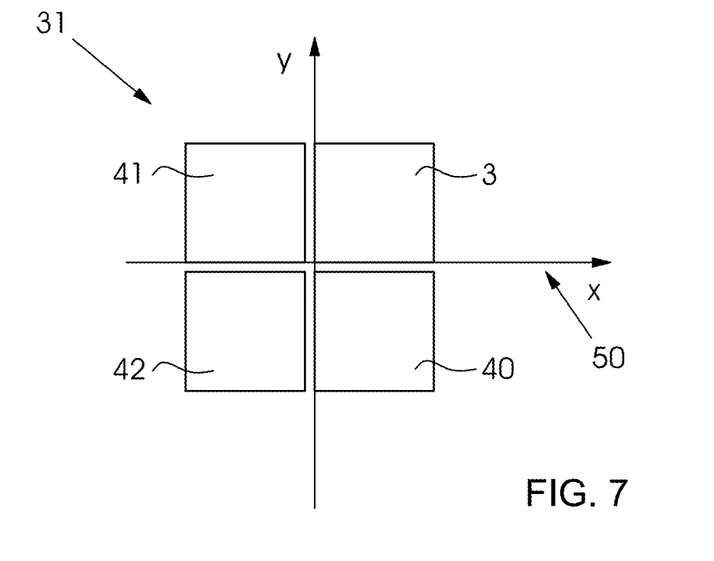
FIG. 7 is an illustration of a further example of threshold value matrices from the matrix of threshold value matrices.

FIG. 7 illustrates an alternative matrix of threshold value matrices 31. In this alternative matrix of threshold value matrices 31, the threshold value matrices 3, 40, 41, 42 are not in each case assigned on their own to the coordinate system 12 of the imaging device, instead all are assigned to a common coordinate system 50, they being located in different positions relative to one another, as based on the origin of the coordinate system 12. This illustration is simply possible since the matrices 3, 40, 41, 42 are in each case only displaced with respect to one another but are stored with their common coordinate system 50 rotated with respect to the coordinate system 12 of the exposer. The rotated threshold value matrices 3, 40, 41, 42 are then once more read out line by line and column by column in relation to the coordinate system 50. The threshold value matrices 40 to 42 of the matrix of threshold value matrices 31 are therefore displaced in relation to the X axis or Y axis or X and Y axis, in each case by one half of a device pixel 11 of the imaging device. Here too, that stated above is also true of a jump from the original threshold value matrix 3 of the rational screen 13 which is intended to approximate a corresponding first irrational screen by means of the screen 13. For the purpose of correct addressing, the further possibly appropriate mirroring operations must be applied to the threshold values in order actually to jump to identical positions.

The rational screen 13 of the threshold value matrices 40 to 42 or 3' to 3'" or B to I is thus in each case a third screen having corresponding second threshold value matrices as opposed to the second X, Y addresses $X_2Y_2$ of the first threshold value matrix 3 which is assigned to the second screen, that is to say the rational screen 13, by which the first, that is to say the irrational screen 20, is to be approximated. For this purpose, the respective second threshold value matrices have third $X_3Y_3$ addresses, in which a jump can be made both from the first threshold value matrix 3 and from other threshold value matrices 3' to 3'", 40 to 41 or B to I, in order to compensate for corresponding displacement errors between the screens 13 currently used and the irrational screen 20.

As a result of this method, chosen in this way, of displaced threshold value matrices, it is sufficient to build up a screen 13 with a lower number of screen cells 1, that is to say with small super cells. At least in terms of content, identical threshold value matrices 3 are always used for the displaced threshold value matrices 3' to 3'", 40 to 42, B to I. In this way, there are no longer defects caused by jumps to points at which device pixels 11 are suddenly to be exposed or not. It is precisely a jump to clear regions in which, in the prior art, a jump is made to regions where there are suddenly exposed bits 15, which leads to unpleasant reductions in the quality of the raster bit map 10.

In this way, for example, a screen 13 can also be built up by a single screen cell 1.

If, in the prior art, a screen cell from the irrational screen 20 has corner points which lie close to integer coordinate points of the coordinate system 12, then hitherto an extremely large super cell was necessary, with a large number of screen cells, in order to show a rational screen 13 which has the closest point of intersection in the coordinate system 12, as based on the screen angle rw. In this regard, see FIG. 4.

According to the system now presented, so to speak, from this only a limited number of screen cells of the super cell may be needed, since it is no longer necessary to jump to a position within the super cell in order to compensate for the error, but simply to a corresponding identical position of a displaced threshold value matrix.

Thus, the two difficulties from the prior art, namely approximating specific irrational screens with a special irrational tangent and, in particular, obtaining unpleasant sudden exposed device pixels 15 in clear regions, are overcome by the method described.

The invention claimed is:

1. A method for digital screening of a halftone image, which comprises the steps of:
    providing a computer for performing the method, the computer performing the steps of:
        providing a first screen having an arbitrary desired screen width, an arbitrary desired screen angle, and assigned $X_1Y_1$ addresses;
        reading out and comparing a first threshold value matrix of a second screen with color values of the halftone image, the second screen having a given screen width, a given screen angle, and assigned $X_2Y_2$ addresses;
        during a reading of threshold values, determining an error D between the XY addresses of the second screen and the first screen;
        providing at least one second threshold value matrix having assigned $X_3Y_3$ addresses, the $X_3Y_3$ addresses of the second threshold value matrix being displaced by a factor 1/B in relation to the $X_2Y_2$ addresses of the first threshold value matrix; and
        reading out the second threshold value matrix as soon as the error D exceeds a predefined limiting value.

2. The method according to claim 1, wherein in terms of content, the second threshold value matrix is substantially identical to the first threshold value matrix.

3. The method according to claim 1, which further comprises starting from the $X_2Y_2$ address of the first threshold value matrix at which the error D exceeds the predefined limiting value, reading out the $X_3Y_3$ addresses of the second threshold value matrix instead of the $X_2Y_2$ addresses provided from the first threshold value matrix.

4. The method according to claim 1, wherein together with the first and second threshold value matrices, a total of n×n matrices are provided as the first and second threshold value matrices, to which XY addresses are assigned, so that the matrices are in each case displaced by the factor 1/B in relation to one another in at least one of an X direction and a Y direction.

5. The method according to claim 4, wherein the factor 1/B corresponds to an nth fraction of a device pixel, n being a root of a number A of the first and second threshold value matrices provided.

6. The method according to claim 4, which further comprises forming the n×n threshold value matrices to be substantially identical to one another.

7. The method according to claim 4, which further comprises storing a reduced extract of at least one of the first and second threshold value matrices and a complete screen is built up by lining up the reduced extract in a row, at least offset line by line, the reduced extract being selected from the first and second threshold value matrices in such a way that its boundaries run parallel to axes of a coordinate system of an imaging device.

8. The method according to claim 7, which further comprises storing one of the first threshold value matrix, the second threshold value matrix and the reduced extract in an electronic, non-transitory storage medium in its own coordinate system that is rotated relative to the coordinate system of the imaging device.

9. The method according to claim 1, which further comprises:
determining in advance a number of read addresses after which the error D exceeds the predefined limiting value;
storing the number of read addresses; and
following a reading of the number of XY addresses from the first threshold value matrices just read out, the error is compensated for by reading out XY addresses from the second threshold value matrix which is displaced substantially by a magnitude of the error.

10. The method according to claim 9, which further comprises dividing up the predefined limiting value into an X component and a Y component and for a purpose of correction, a jump is made to the second threshold value matrix which is displaced by the error in D in the X direction and/or by the error in D in the Y direction.

11. The method according to claim 10, wherein depending on a sign of the error D between the XY addresses to be read out from the first screen and the first threshold value matrix read out, a jump is made either to the same XY addresses of the second threshold value matrix provided for a correction or to an XY address different by one address in the X and/or Y direction of the second threshold value matrix provided for the correction.

12. The method according to claim 4, which further comprises using 2×2 or 3×3 matrices which are all displaced in relation to one another in at least one of an X direction and a Y direction by the factor 1/B with the same sign in each case.

13. A non-transitory computer-readable medium containing computer-executable instructions to be executed on a computer for performing a method, comprising the steps of:
storing n×n threshold value matrices which are each assigned to XY addresses and a common coordinate system;
reading out said n×n threshold value matrices in order to screen a halftone image, said n×n threshold value matrices having threshold values;
comparing the threshold values with a color of a point of the halftone image;
determining whether a bit is set in a bit map corresponding to the halftone image;
displacing said threshold values of one of said n×n threshold value matrices in pairs by at least one fraction 1/B in relation to said XY addresses of another one of said n×n threshold value matrices.

14. The computer-readable medium according to claim 13, wherein said XY addresses of said n×n threshold value matrix are displaced by the fraction 1/B in relation to the common coordinate system with said other n×n threshold value matrices.

15. The computer-readable medium according to claim 14, wherein said threshold values of said n×n threshold value matrix are displaced in relation to the XY addresses of said other n×n threshold value matrix by at least one fraction 1/B, and said n×n threshold value matrices themselves are stored in rotated form with respect to the coordinate system and are preferably built up in accordance with an extract of a matrix, said extract having boundaries parallel to the coordinate system.

16. The computer-readable medium according to claim 13, wherein n is preferably chosen from a set comprising 2 and 3.

17. The computer-readable medium according to claim 16, wherein said fraction 1/B corresponds to a value 1/n.

* * * * *